United States Patent [19]

Smith et al.

[11] Patent Number: 5,340,054

[45] Date of Patent: Aug. 23, 1994

[54] SUPPRESSOR OF OSCILLATIONS IN AIRFRAME CAVITIES

[75] Inventors: Robert A. Smith; Ephraim Gutmark; Klaus C. Schadow; Kenneth J. Wilson, all of Ridgecrest, Calif.

[73] Assignee: The United States of America as represented by the Secretary of the Navy, Washington, D.C.

[21] Appl. No.: 839,721

[22] Filed: Feb. 14, 1992

Related U.S. Application Data

[63] Continuation of Ser. No. 658,274, Feb. 20, 1991, abandoned.

[51] Int. Cl.$^5$ ............................................. B64C 21/00
[52] U.S. Cl. .................................. 244/1 N; 244/130; 244/1 R
[58] Field of Search ............ 244/1 N, 1 R, 130, 137.1, 244/137.4, 200, 199; 114/274, 282; 296/180.1

[56] References Cited

U.S. PATENT DOCUMENTS

| | | | |
|---|---|---|---|
| H501 | 8/1988 | Rubin et al. | 244/1 R |
| 1,837,901 | 12/1931 | Föttinger et al. | 244/130 |
| 2,685,470 | 8/1954 | Werner | 244/130 |
| 2,749,064 | 6/1956 | Kuhlman, Jr. | 244/137.1 |
| 2,791,387 | 5/1957 | Weinberg | 244/137.1 |
| 3,934,846 | 1/1976 | Maurer | 244/130 |
| 4,611,616 | 9/1986 | Pohl et al. | 137/15.1 |
| 4,618,109 | 10/1986 | Victor | 244/213 |
| 4,648,567 | 4/1987 | Maudal et al. | 244/3.24 |
| 4,650,139 | 3/1987 | Taylor et al. | 244/161 |
| 4,693,201 | 9/1987 | Williams et al. | 114/67 |
| 4,697,764 | 10/1987 | Hardy et al. | 244/137.4 |
| 4,703,904 | 11/1987 | Haslund | 244/1 R |
| 4,706,910 | 11/1987 | Walsh et al. | 244/130 |
| 4,712,752 | 12/1987 | Victor | 244/129.1 |
| 4,718,620 | 1/1988 | Braden et al. | 244/199 |
| 4,736,912 | 4/1988 | Loebert | 244/130 |
| 4,741,498 | 5/1988 | Gerhardt | 244/130 |
| 4,753,401 | 6/1988 | Bechert | 244/130 |
| 4,755,416 | 7/1988 | Schneider et al. | 244/1 N |
| 4,802,642 | 2/1989 | Magniarotly | 244/130 |
| 4,836,473 | 6/1989 | Aulehla et al. | 244/207 |
| 5,069,397 | 12/1991 | Haslund | 244/1 R |

FOREIGN PATENT DOCUMENTS

| | | | |
|---|---|---|---|
| 3925808 | 2/1991 | Fed. Rep. of Germany | 296/180.1 |
| 037582 | 6/1990 | United Kingdom | 244/1 N |

OTHER PUBLICATIONS

Barnes W. McCormick, *Aerodynamics, Aeronautics, and Flight Mechanics*, 1979, pp. 167–168.

*Primary Examiner*—Michael S. Huppert
*Assistant Examiner*—Anne E. Bidwell
*Attorney, Agent, or Firm*—Robert J. Hampsch; Melvin J. Sliwka; John L. Forrest, Jr.

[57] ABSTRACT

The oscillations found to occur in the cavities of an structural frame moving through a fluid are substantially eliminated by the adoption of perturbation elements located at the leading edge of the cavity and reflecting any remaining oscillations out of the cavity at the trailing edge. The perturbation elements may take the form of multiple pins of various shape and geometrical arrangement which prevents the generation and growth of vortices causing acoustic oscillations. The reflection of remaining oscillations out of the cavity may be accomplished by ramping the trailing edge of the cavity.

12 Claims, 3 Drawing Sheets

SUPPRESSOR OF OSCILLATIONS IN AIRFRAME CAVITIES

This is a continuation of application Ser. No. 07/658,274 filed on Feb. 20, 1991, now abandoned.

BACKGROUND OF THE INVENTION

1. Field of the Invention

This invention relates in general to fluid dynamic flow technology. More particularly the invention relates to a method and apparatus for suppressing vibrations caused by pressure oscillations in structures having cavities located therein that are moving through a media.

2. Description of the Related Art

In the testing and development of systems for reducing and/or eliminating vibrations found to occur in missiles during flight due to pressure oscillations, i.e. noise, in the cavities once the retractable wings are deployed, examination of oscillations measured in experimental cavities indicate that such oscillations may be suppressed by the installation, at the leading edge of the cavity, of members that disrupt the formation of coherent flow structures. The destruction of the coherent flow structures eliminates the source for noise generation related to impingement of these coherent flow structures on the trailing edge of the cavity. These same coherent flow structures are evident in outer space vehicles, ground surface vehicles and water vehicles, both surface and subsurface craft, having cavities exposed to the media through which the vehicle moves.

Devices have been known in the past for influencing the flow of a medium to control its effect on a body of a vehicle, such as an air foil or other portion of the structure of an aircraft or missiles moving relative to the medium. Vortex generators thus have been implemented in numerous aircraft systems to generate fluid elements upstream of locations where boundary layer separation is incipient. By selective deployment of vortex generators, boundary layer flow separation may be prevented and strong variations in the flow avoided.

One apparatus for influencing the boundary layer on the surface of a body moving through a medium is disclosed in U.S. Pat. No. 4,836,473. As disclosed in said patent, boundary layer influencing members are rigidly secured to the skin of an aircraft, including the wings, the tail and empennage, and the body adjacent to the tail. The members are characterized as vortex generators and boundary layer diverters and are located on the skin of the aircraft directly in the path of the airstream. Where flush air intakes are to be configured, the members are placed upstream of the entrances to the intakes themselves.

Another arrangement for modifying the aerodynamic characteristics of an object in flight is shown in U.S. Pat. No. 4,650,139. As disclosed in the patent, and as applied to a space vehicle system, an attempt is made to alter the aerodynamic flow around the vehicle by attaching to the external tank and orbiter of a space shuttle, a spike or rod to reduce aerodynamic heating and drag on the vehicle during its ascent to orbit.

One other construction employed to reduce the drag between a surface of an object and a free stream moving relative to it is shown in U.S. Pat. No. 4,693,201. As the patent discloses, the construction utilizes a plurality of longitudinally extending, parallel, and spaced apart linear vortices which extend transversely of the free stream. Although the vortices retain the same relationship with each other, they traverse the surface in the same direction as the free stream but at approximately half of its speed. A plurality of apertures are utilized in the surface construction.

The device as used in U.S. Pat. No. 4,706,910 causes break-up of large scale disturbances in the boundary layer of the flow field. Longitudinal striations forming vee-shaped grooves, and parallel ribbons suspended transversely across the flow surface, reduce skin friction on aerodynamic and hydrodynamic surfaces.

In an apparatus for reducing drag, U.S. Pat. No. 4,736,912 discloses a body having relative movement with a fluid and a surface zone having therein a plurality of longitudinal channels. Each channel includes a longitudinal gap which extends in a direction parallel to the direction of the flow. A reduction in turbulent drag is experienced in the body during movement.

Although generally satisfactory results can be considered to develop from application of the above-exemplary related art systems, their main purpose is centered on the creation of vortices for achieving the various results as explained in the preceding paragraphs hereinabove. The present invention is directed to the elimination of acoustic oscillation by preventing the generation and growth of vortices in a simple and economically feasible modification of existing vehicles or crafts which are susceptible to design consideration induced oscillations.

SUMMARY OF THE INVENTION

The invention of suppressing fluid media dynamically induced pressure oscillations in a cavity located in a vehicle moving through a fluid medium, i.e. water or the various layers of the atmosphere, is the result of studying the effects of boundary layer control in airframes. Boundary influencing members are known to affect various flow structures by different surfaces of an aircraft. The oscillations generated through flow separation are detrimental to the airframe and can lead to damage to vital components and reduction of operational capability. In a vehicle having a cavity exposed to an external medium flow, such as may occur in a missile after deploying wings during the period following launch or in aircraft with open weapon bays or deployed wheels or in cars with retractable roof vent or water craft with cavities resulting when steering planes have been deployed, acoustic oscillations which the cavity experiences are reduced or eliminated by mounting vortex disrupting members in advance of the upstream end of the cavity. The vortex disrupting members interfere with the media coherent flow structures by generating small-scale turbulence which do not develop an acoustic source. Accordingly, in the preferred embodiment of the invention, a cavity in a structural framework is installed in a supersonic airstream, the length of the opening of the cavity is varied and acoustical measurement made for each length, all acoustic modes in the cavity are identified, and various methods are used to disturb the initial shear layer of the airstream thereby eliminating acoustic resonance in the cavity. Extremely practical results were achieved by using a number of small round pins rigidly installed in the plane of the structural framework upstream of the leading edge of the opening of the cavity to disrupt the media coherent flow by generating small-scale turbulence and then sloping the trailing edge of the cavity into a ramp to deflect the vortices outside the cavity instead of into the cavity where amplification occurs. A significant decrease in acoustical oscillations was observed.

Accordingly, an object of the invention is the reduction of acoustical oscillations generated in cavities in vehicles during movement through a medium.

Another object of the invention is the optimum configuration of vortex disrupting members.

Another object of the invention is the optimum configuration of the opening of the cavities subjected to large scale acoustical oscillation.

A further object of the invention is to eliminate cavity resonance in a cavity subjected to the passage of a media flow.

Another feature of the invention is the novel use of acoustical measurement to determine optimum reduction in the magnitude of acoustical oscillations developed in the cavity of a structure which opens to the exterior of the vehicle or craft.

Still another feature characterizing the present invention is the construction of a low cost spoiler of acoustical oscillations which is simple in design, rugged in construction, and economical to manufacture and install.

Other objects of the invention will become apparent from the following detailed description of the embodiment of the invention when taken in conjunction with the accompanying drawings, wherein similar reference characters refer to similar parts in each of the views.

DESCRIPTION OF THE PREFERRED EMBODIMENT

Figure 1:
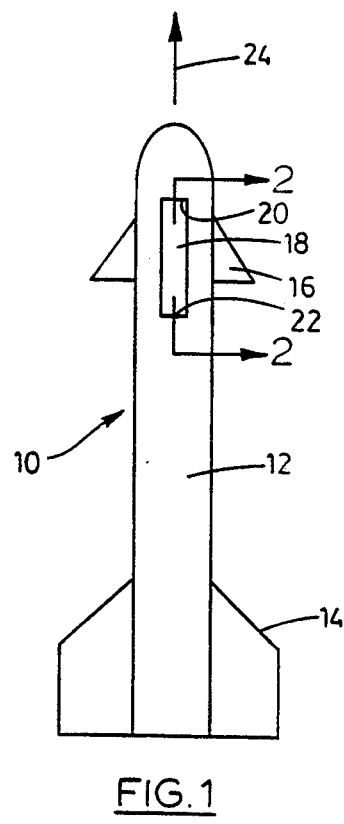
FIG. 1 is an elevation view of a missile or rocket showing the basic cavity exposed to the airstream once a retractable wing is deployed.

In the embodiment shown in the accompanying drawings, and particularly as shown in FIG. 1, the profile view of a missile 10 shows a cylindrical body 12 having tail and empennage 14 attached thereto for providing stability during flight in a manner well known to those skilled in the art. Mounted forward of the empennage 14 in a position near the nose of missile 10 are miniature wings 16 shown in extended position to provide additional stability and control of the missile once in full flight. Prior to launch, such as periods while still attached to the pylons of an aerial platform, the wings 16 are contained within the body of missile 10 such as within a well or cavity 18 aerodynamically sealed with a suitable cover or shield (not shown). Once airborne, the wings 16 are deployed into new positions, such as shown in FIG. 1, to make their aerodynamic design contribution to the stability and directional control of the missile.

Figure 2:
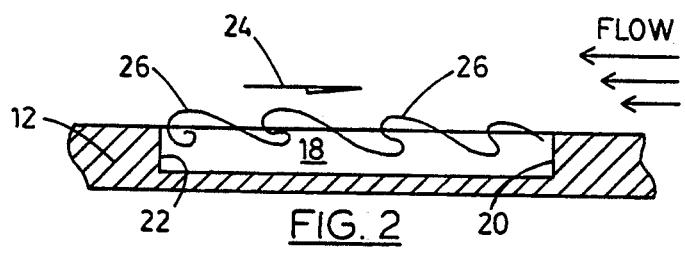
FIG. 2 is a cross sectional view taken along the lines 2—2 of FIG. 1.

As shown in FIG. 1, the employment of the wings 16 to lift sustaining positions within the airstream results in the appearance in the body 12 of a cavity 18 which extends into the interior of the missile 10 by virtue of having been relieved of the containment of the wing 16. The cavity 18 may be of any geometrical shape, such as circular, elliptical, slotted, rectangular, or square such that the cavity is sufficient for containment of the wings 16 prior to their deployment. The direction of flight of the missile 10 in accordance with the present invention is shown by the arrow 24 in FIGS. 1 & 2. The direction of flight 24 is opposite the direction of the media flow. FIGS. 1 & 2 thus shows that within the context of a missile moving through a fluid medium, the outline of the cavity 18 defines an interior leading edge 20 at the upstream or leading end of the cavity 18 and a posterior or trailing edge 22 located at the downstream or trailing end of cavity 18.

The appearance or emergence of the cavity 18 upon deployment of the wings 16 effect an airflow directly over the opening created by the cavity 18 at speeds directly related to the velocity of the missile 10. In FIG. 2, the section of body 10 containing the cavity 18 is shown exposed to the flow of air counter to the direction of flight arrow 24. Severe and unsteady acceleration induced vibrations are experienced by the missile 10 by the presence of acoustic oscillations (noise) which develop within the cavity 18 once exposed to the airstream. Aerodynamically induced oscillations occur in the cavity 18 by the emergence of vortices 26 which are generated and grow in intensity during the flow of air in the direction from right to left as viewed in FIG. 2. Such oscillations are suspected to be related to the geometric shape of the cavity 18 and are excited by acoustic feedback due to the impingement of the coherent vortices in the shear layer on the trailing edge 22 as a result of separation of the flow from the leading edge 20. As stated hereinabove, these oscillations are detrimental to the airframe of a missile in flight by contributing to potential damage of its components and reduction of its operational capability.

Figure 3:
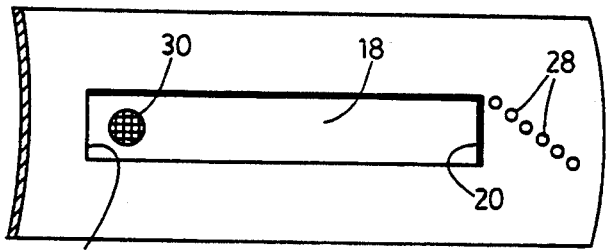
FIGS. 3, 3a, 3b show several variations of a top plan view of a land vehicle embodying the invention.
Figure 4:
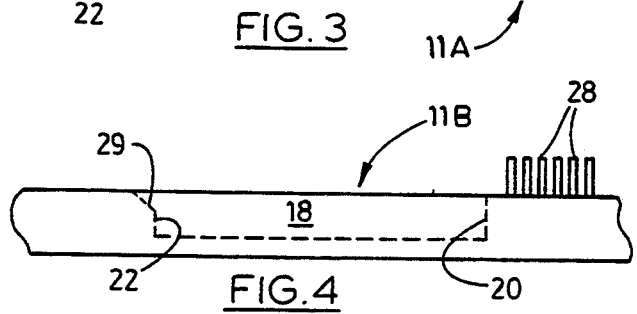
FIG. 4 is a side view of a water craft embodying the invention.

A section of the body 12 of the land vehicle 11a and water craft 11b are further illustrated in FIGS. 3, 3a, 3b, and 4 in conjunction with a simulated cavity 18. In accordance with the present invention, the flow of the fluid medium over the cavity 18 is perturbed by a number of upstanding pins 28 rigidly attached to the body 12 proximate to and in advance of the leading edge 20. While the pins 28 in FIG. 3 are shown as being round and arranged essentially in a straight line at a 45° angle to the direction of travel, other configurations and varying heights of the pins and other similar geometries of pins may readily be substituted, as shown in FIG. 6. Regardless of the geometrical arrangement employed, installation of the pins 28 prevents the generation and growth of vortices responsible for vibrations encountered once the wings 16 are deployed. Additionally, the trailing edge 22 is configured as a ramp 29 which further reduces the effect of the vortices impinging on the trailing edge and reflects the sound waves outside the cavity 18 area instead of inside where it is amplified.

Figure 7A:
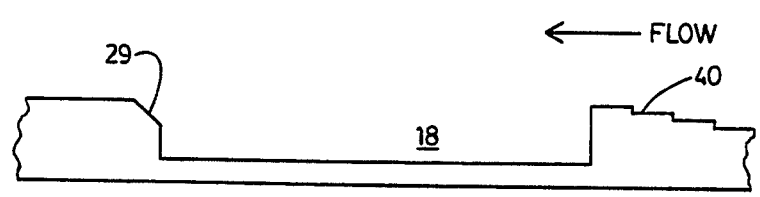
FIG. 7a and FIG. 7b show several variations of the leading edge of the cavity in the present invention.
Figure 7B:
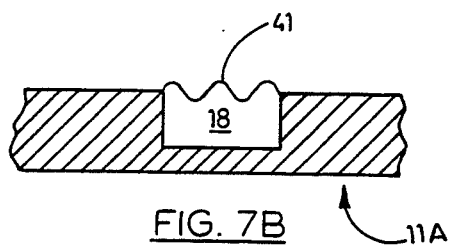
Figure 6A:
FIGS. 6a, 6b, 6c, 6d and 6e show several variations of arrangements of the vortex disrupting members in the embodiment shown in FIG. 3.
Figure 6B:
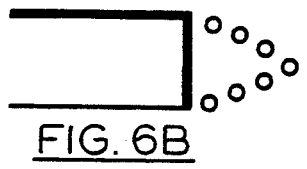
Figure 6C:
Figure 6D:
Figure 6E:
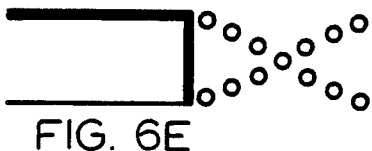

The preferred method of disrupting vortices, such as the use of the pins 28 and ramp 29, or alternative methods, such as a leading edge multi-step ramp 40 and a leading edge corrugated lip 41, as shown in FIG. 7, are relatively simple to implement in an existing airframe of an airborne system and the effectiveness in substantially completely eliminating acoustical oscillations is experimentally verified. An acoustic transducer 30, such as a microphone, is located within the cavity 18 adjacent to the trailing edge 22 for measuring the original amplitude of the oscillations and the attenuated conditions achieved by fragmentation of the shearlayer vortices.

Figure 5:
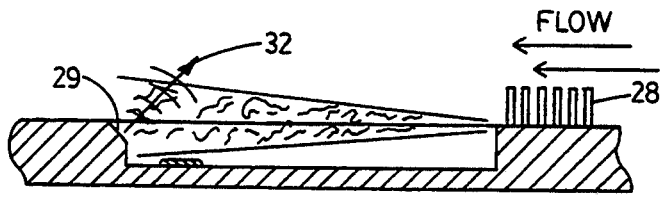
FIG. 5 is a view similar to FIG. 2 and shows the effects of acoustical reduction in accordance with the present invention.
Figure 3A:
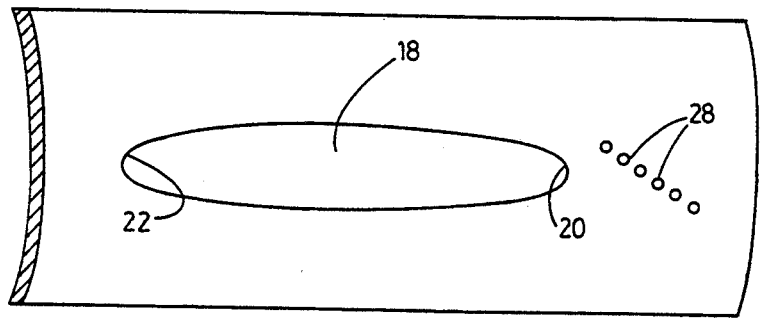
Figure 3B:
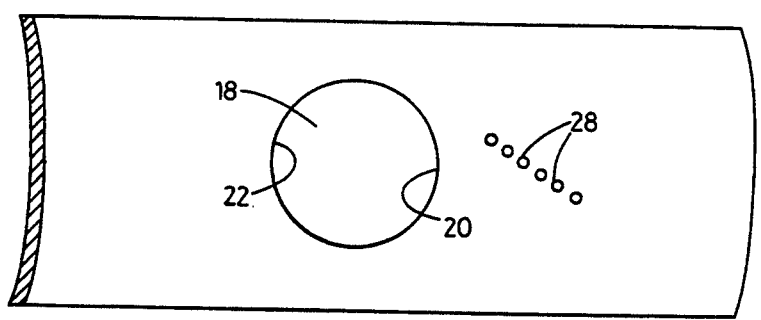

FIG. 5 illustrates the altered airflow regions created by the presence of the pins 28 and the effect of deflection by the ramp 29 at the trailing edge 22. The flow is directed, as described hereinabove in connection with FIG. 2, from the leading edge 20 to the trailing edge 22 of the cavity 18, but is shown modified by the pins 28 into a form of small-scale turbulence 32 which nullifies the acoustical modes generated in the cavity, and the ramp 29 reflects the small-scale turbulence 32 outside the cavity 18. Stated differently, the pins 18 disrupt the shear layer which emanates from the leading edge 20 of the cavity. The destruction of the coherent structure and the reflection of the small-scale turbulence 32 outside the cavity eliminates the source for noise generation related to their impingement on the cavity's trailing edge.

In one example of the embodiment, illustrated in FIG. 3, seven to ten round pins each one-sixteenth inches in diameter and one-half inch in length, are adjusted in the arrangement shown in FIG. 3. These pins are then are installed in a line at generally 45° angle to the flow. Other pin geometries and patterns are shown in FIGS. 6a-6e. The ramp 29 is shown at an angle of approximately 45° and extending approximately one-half the depth of the cavity 18.

The present invention is not limited exclusively to missiles having a wing slot, but it is also applicable to aircraft with open cavities such as weapon bays and wheel wells. In addition, the present invention is applicable to any vehicle where there is an acoustic reaction between a moving physical surface defining a cavity and a fluid medium, such as air or water, including, but not limited to, ground surface vehicles 11a (See FIG. 3), such as automobiles or trucks designed to include a retractable custom roof vent mounted above the head of the driver, and may also include crafts used on water 11b (See FIG. 4) and underneath the surface of water. It, therefore, will be appreciated that the invention may be practiced in environments other than the flight regime specifically described. It will also be appreciated that the shape of the opening defining the cavity may be of any geometric shape, such as circular, elliptical, slotted, rectangular, rectangular with rounded ends, or square and still benefit from the invention. It will also be appreciated that the pins may be other than round, such as square, octagon, hexagon, diamond or elliptical shaped.

Having described the invention in detail, those skilled in the art will appreciate that modifications may be made of the invention without departing from its spirit. Accordingly, the above and other features of the present invention are illustrative only of preferred embodiments of the present invention, and it is obvious that a variety of modifications and changes may be made without departing from the intended scope of the invention. Rather, it is intended that the scope of this invention be determined by the appended claims and their equivalents.

What is claimed is:

1. A method for reducing acoustic oscillations generated in a cavity of a vehicle moving through a fluid medium, comprising the steps of:

adjusting the arrangement and heights of a plurality of perturbation pins relative to the cavity dimensions and location as well as to other perturbation pins present to reduce the acoustic oscillations to a minimum;

installing the perturbation pins rigidly into the vehicle in said adjusted arrangement ahead of the cavity to disrupt generated vortices; and reflecting any remaining acoustic oscillations out of the cavity as the vehicle moves through the fluid medium.

2. A method for reducing acoustic oscillations generated in a cavity of a vehicle moving through a fluid medium, comprising the steps of:

installing a plurality of perturbation pins into the vehicle ahead of the cavity;

moving the vehicle through the fluid medium;

adjusting the arrangement and heights of the perturbation pins relative to the cavity shape, dimensions and location as well as to the other perturbation pins present to disrupt generated vortices and reduce the acoustic oscillations to a minimum; and reflecting any remaining acoustic oscillations out of the cavity as the vehicle moves through the fluid medium.

3. Apparatus for reducing acoustic oscillations, comprising:

a vehicle for moving through a fluid medium, the vehicle having a cavity located therein;

a plurality of perturbation pins proximate the cavity for reducing acoustic oscillations by creating an effective amount of small scale turbulence flow over the cavity when the cavity is exposed to an external flowing medium, the perturbation pins adjustably installed in advance of a leading edge of the cavity such that the arrangement and heights of the perturbation pins are adjustably relative to the cavity shape and dimensions as well as to the other perturbation pins present to disrupt generated vortices and reduce the acoustic oscillations to a minimum; and acoustic reflecting means for reflecting acoustic oscillations out of the cavity, 4. Apparatus for reducing acoustic oscillations according to claim 3 wherein the cavity has rectangular dimensions.

5. Apparatus for reducing acoustic oscillations according to claim 3 wherein the cavity is a circle.

6. Apparatus for reducing acoustic oscillations according to claim 3 wherein other cavity is elliptic in shape.

7. Apparatus for reducing acoustic oscillations according to claim 3 wherein the reflecting means is a sloped trailing edge of the cavity.

8. Apparatus for reducing acoustic oscillation according to claim 3 wherein the plurality of perturbation pins are upright pins rigidly installed in advance of the leading edge of the cavity.

9. Apparatus for reducing acoustic oscillations, comprising:

a vehicle for moving through a fluid medium, the vehicle having a cavity located therein;

a corrugated lip proximate the cavity for reducing acoustic oscillations by creating an effective amount of small scale turbulence flow over the cavity when the cavity is exposed to an external flowing medium, the corrugated lip installed in advance of a leading edge of the cavity to disrupt generated vortices and reduce the acoustic oscillations to a minimum; and acoustic reflecting means for reflecting acoustic oscillations out of the cavity.

10. Apparatus for reducing acoustic oscillations, comprising:

a vehicle for moving through a fluid medium, the vehicle having a cavity located therein;

a multi-step ramp proximate the cavity for reducing acoustic oscillations by creating an effective amount of small scale turbulence flow over the cavity when the cavity is exposed to an external flowing medium the multi-step ramp installed in advance of a leading edge of the cavity to disrupt generated vortices and reduce the acoustic oscillations to a minimum;

acoustic reflecting means for reflecting acoustic oscillations out of the cavity.

11. Apparatus for reducing acoustic oscillations, comprising:

a land vehicle for moving through a fluid medium, the land vehicle having a cavity located therein;

a perturbation means proximate the cavity for reducing acoustic oscillations by creating an effective amount of small scale turbulence flow over the cavity when the cavity is exposed to an external flowing medium; and acoustic reflecting means for reflecting acoustic oscillations out of the cavity.

12. Apparatus for reducing acoustic oscillations, comprising:

a water craft for moving through a fluid medium, the water craft having a cavity located therein;

a perturbation means proximate the cavity for reducing acoustic oscillations by creating an effective amount of small scale turbulence flow over the cavity when the cavity is exposed to an external flowing medium; and acoustic reflecting means for reflecting acoustic oscillations out of the cavity.

* * * * *